United States Patent
Oomori

(10) Patent No.: US 8,218,175 B2
(45) Date of Patent: Jul. 10, 2012

(54) PRINTING SYSTEM, PRINT CONTROLLER, PRINTING METHOD AND COMPUTER READABLE MEDIUM

(75) Inventor: Satoshi Oomori, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1247 days.

(21) Appl. No.: 11/822,806

(22) Filed: Jul. 10, 2007

(65) Prior Publication Data

US 2008/0106754 A1 May 8, 2008

(30) Foreign Application Priority Data

Nov. 8, 2006 (JP) ................................. 2006-303329

(51) Int. Cl.
*G06F 3/12* (2006.01)
*G06F 15/16* (2006.01)
*G06F 7/04* (2006.01)
*G06F 21/00* (2006.01)
*G06K 15/00* (2006.01)
*G06K 15/02* (2006.01)

(52) U.S. Cl. ....... 358/1.15; 358/1.2; 358/1.18; 709/229; 726/2; 726/17; 713/182

(58) Field of Classification Search .................. 358/1.15, 358/1.16, 1.1, 1.18, 1.19; 726/2, 17
See application file for complete search history.

(56) References Cited

U.S. PATENT DOCUMENTS

| 7,609,412 B2 | 10/2009 | Maruyama |
| 2002/0089693 A1 | 7/2002 | Maruyama |
| 2005/0267797 A1 | 12/2005 | Takahashi et al. |
| 2007/0107042 A1* | 5/2007 | Corona .............................. 726/2 |

FOREIGN PATENT DOCUMENTS

| JP | A-10-161823 | 6/1998 |
| JP | A-2002-63008 | 2/2002 |
| JP | A-2002-259100 | 9/2002 |
| JP | A-2004-303129 | 10/2004 |
| JP | A-2005-346180 | 12/2005 |

OTHER PUBLICATIONS

Aug. 9, 2011 Office Action issued in Japanese Patent Application No. 2006-303329 (with translation).

* cited by examiner

*Primary Examiner* — Charlotte M Baker
*Assistant Examiner* — Rury Grisham
(74) *Attorney, Agent, or Firm* — Oliff & Berridge, PLC

(57) ABSTRACT

The printing system is provided with: a terminal that outputs print data of a print target and authentication information required for performing a print operation; an image forming unit that receives the print data and the authentication information and that prints the print data on condition that printing authority for permitting the print operation is given to the authentication information; and an authority information memory that stores printing authority information on the presence or absence of the printing authority given to each of the authentication information in the image forming unit. The terminal includes an authentication information obtaining unit that obtains the authentication information; an authority information obtaining unit that obtains the printing authority information; and a print determination unit that determines whether or not the authentication information obtained by the authentication information obtaining unit permits a specific print operation on the basis of the printing authority information obtained.

17 Claims, 15 Drawing Sheets

FIG.4A

| USER NAME | USER ID | PASSWORD | PRINTER 4A | PRINTER 4B | PRINTER 4C |
|---|---|---|---|---|---|
| USER_A | USER NAME_1 | ****** | PERMITTED | NOT PERMITTED | NOT PERMITTED |
| USER_B | USER NAME_2 | ###### | NOT PERMITTED | PERMITTED | NOT PERMITTED |
| USER_C | USER NAME_3 | $$$$$$ | NOT PERMITTED | NOT PERMITTED | PERMITTED |
| USER_D | USER NAME_4 | %%%%%% | NOT PERMITTED | PERMITTED | PERMITTED |
| ... | ... | ... | ... | ... | ... |

FIG.4B

| USER NAME | USER ID | PASSWORD | OUTPUT OF THE COLOR PRINTING | THE RESTRICTED NUMBER OF THE SHEETS FOR PRINT | ONE SIDE / ONE UP |
|---|---|---|---|---|---|
| USER_A | USER NAME_1 | ****** | NOT PERMITTED | 10 | NOT PERMITTED |
| USER_B | USER NAME_2 | ###### | PERMITTED | 100 | NOT PERMITTED |
| USER_C | USER NAME_3 | $$$$$$ | PERMITTED | 100 | PERMITTED |
| USER_D | USER NAME_4 | %%%%%% | NOT PERMITTED | 30 | NOT PERMITTED |
| ... | ... | ... | ... | ... | ... |

FIG.12A

| USER NAME | USER ID | PASSWORD | PRINTER 4A |
|---|---|---|---|
| USER_A | USER NAME_1 | ******* | PERMITTED |
| USER_B | USER NAME_2 | ####### | NOT PERMITTED |
| USER_C | USER NAME_3 | $$$$$$$ | PERMITTED |
| USER_D | USER NAME_4 | %%%%%%% | NOT PERMITTED |
| ... | ... | ... | ... |

FIG.12B

| USER NAME | USER ID | PASSWORD | OUTPUT OF THE COLOR PRINTING | THE RESTRICTED NUMBER OF THE SHEETS FOR PRINT | ONE SIDE / ONE UP |
|---|---|---|---|---|---|
| USER_A | USER NAME_1 | ******* | NOT PERMITTED | 10 | NOT PERMITTED |
| USER_B | USER NAME_2 | ####### | PERMITTED | 100 | NOT PERMITTED |
| USER_C | USER NAME_3 | $$$$$$$ | PERMITTED | 100 | PERMITTED |
| USER_D | USER NAME_4 | %%%%%%% | NOT PERMITTED | 30 | NOT PERMITTED |
| ... | ... | ... | ... | ... | ... |

PRINTING SYSTEM, PRINT CONTROLLER, PRINTING METHOD AND COMPUTER READABLE MEDIUM

CROSS REFERENCE TO RELATED APPLICATIONS

This application is based on and claims priority under 35 USC §119 from Japanese Patent Application No. 2006-303329 filed Nov. 8, 2006.

BACKGROUND

1. Technical Field

The present invention relates to a printing system in which a printer is connected to a terminal, a print controller, a printing method, and a computer readable medium.

2. Related Art

Recently, a printing system in which one or plural terminals and one or plural printers are connected via a network such that one or plural printers are shared or are selected from one or plural terminals has been configured, for example, in offices.

There is such a printing system that is provided with a management server for managing use of the printers. In addition, when a user intends to perform a print operation in a specific printer, the management server confirms whether or not the user has usage authority of the printer, or whether or not the user has usage authority set in each printing function, or the like. The print operation of the printer or the use of a specific printing function is permitted to the user on condition that the user receives the authentication from the management server.

SUMMARY

According to an aspect of the invention, there is provided a printing system including: a terminal that outputs print data of a print target and authentication information required for performing a print operation; an image forming unit that receives the print data and the authentication information from the terminal and that prints the print data on condition that printing authority for permitting the print operation is given to the authentication information; and an authority information memory that stores printing authority information on the presence or absence of the printing authority given to each authentication information in the image forming unit. The terminal includes: an authentication information obtaining unit that obtains the authentication information; an authority information obtaining unit that obtains the printing authority information from the authority information memory; and a print determination unit that determines whether or not the authentication information obtained by the authentication information obtaining unit permits a specific print operation by the image forming unit on the basis of the printing authority information obtained by the authority information obtaining unit.

BRIEF DESCRIPTION OF THE DRAWINGS

Exemplary embodiment(s) of the present invention will be described in detail based on the following figures, wherein:

FIG. 4A is a diagram illustrating an example of the printing authority information, which is stored in the printing authority information storage unit in a table form, on the presence or absence of the printing authority in the printers in response to the user identifying information;

FIG. 4B is a diagram illustrating an example of the printing authority information, which is stored in the printing authority information storage unit in a table form, on the presence or absence of the usage authority for various printing functions in the printer which has the printing authority in response to the user identifying information;

FIG. 12A is a diagram illustrating an example of the printing authority information, which is stored in the printing authority information storage unit of the printer as an example among the printers in a table form, on the presence or absence of the printing authority in the printer in response to the user identifying information;

FIG. 12B is a diagram illustrating an example of the printing authority information, which is stored in the printing authority information storage unit of the printer as an example among the printers in a table form, on the presence or absence of the usage authority for various printing functions in the printer in response to the user identifying information.

DETAILED DESCRIPTION

Hereinafter, exemplary embodiments of the invention will be described in detail with reference to the drawings.

First Exemplary Embodiment

Figure 1:
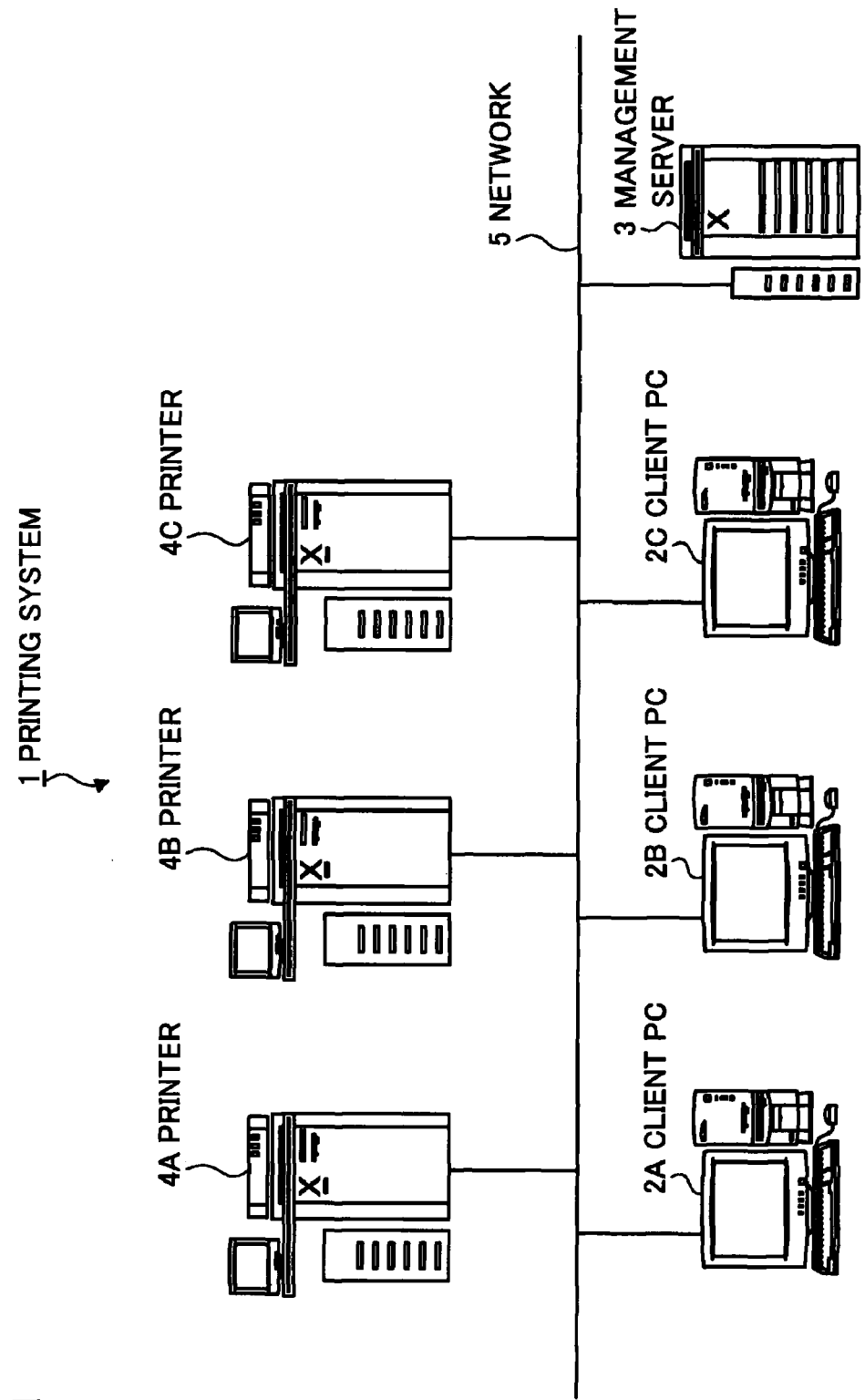
FIG. 1 is a diagram illustrating the overall configuration of a printing system according to a first exemplary embodiment.

FIG. 1 is a diagram illustrating the overall configuration of a printing system 1 according to a first exemplary embodiment. In the printing system 1 shown in FIG. 1, for example, plural client PCs (personal computers) 2 (2A to 2C), which are examples of terminals (terminal devices), installed in a user's work space (for example, desk), plural printers 4 (4A to 4C), which are examples of image forming units (image forming apparatuses) to print document data generated in the client PCs 2 on a medium such as print paper (hereinafter, referred to as "paper"), and a management server 3 that manages the use of the printer 4 by the client PC 2 are configured to be connected via a network 5 such as LAN (Local Area Network), WAN (Wide Area Network), or Internet such that interactive communication is possible. A communication line may include a telephone line or a satellite communication channel (for example, a spatial transmission channel of digital satellite broadcasting). In the printing system 1 according to the first exemplary embodiment, the plural client PCs 2 and the plural printers 4 are connected on the network 5. Three client PCs 2A to 2C and three printers 4A to 4C are connected as an example in the configuration as shown in FIG. 1.

The client PC 2 has a function of making or storing document data including documents, figures, pictures, or the like. In addition, the client PC 2 instructs any designated printer 4 to print document data via the management server 3. In performing the print operation, the client PC 2 determines whether or not the print operation is permitted, or whether or not the use of various printing functions is permitted in the printer 4 to be designated for printing, or the like before performing the actual print operation. In addition, in cases where performing the print operation in the printer 4 to be designated for printing is not permitted, using the specific printing functions in the printer 4 to be designated for printing is not permitted, or the like, the client PC 2 has a function of displaying the message regarding the non-permitted operation and a function for the setup not to permit the designation of the printer 4 for performing the print operation and not to permit the use of the specific printing function.

Figure 2:
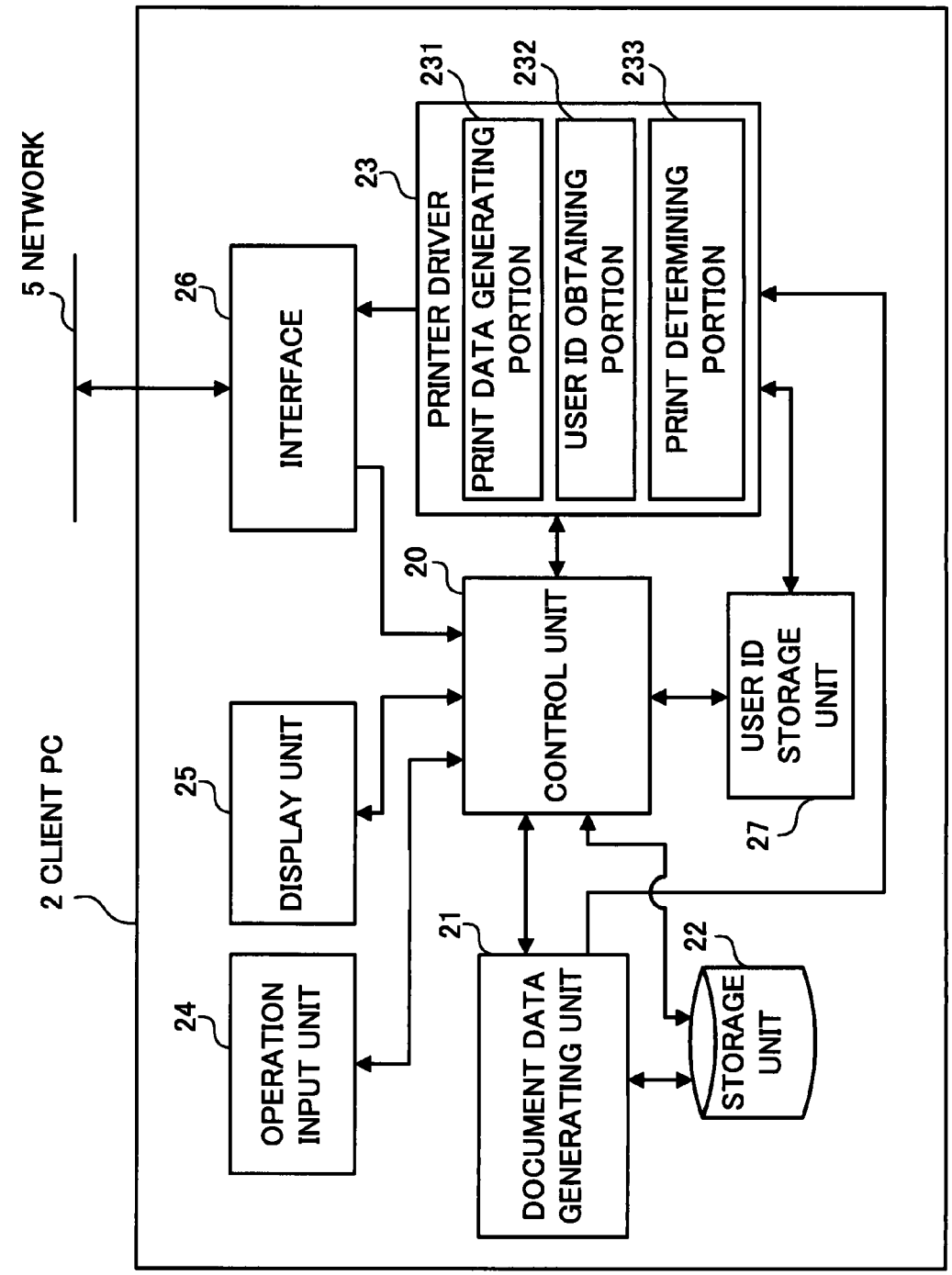
FIG. 2 is a block diagram illustrating the functional configuration of the client PC.

FIG. 2 is a block diagram illustrating the functional configuration of the client PC 2. As shown in FIG. 2, the client PC 2 includes a control unit 20, a document data generating unit 21, a storage unit 22, a printer driver 23, an operation input unit 24, a display unit 25, an interface 26, and a user ID storage unit 27.

The control unit 20 controls the entire operation of the client PC 2 in accordance with a predetermined control program.

The document data generating unit 21 generates the document data including documents, figures, pictures, or the like or edits the stored document data in accordance with predetermined application software, or the like.

The storage unit 22 may be configured as, for example, hard disk drive. The storage unit 22 stores and saves the document data, programs, or the like.

The operation input unit 24, which is an example of an authentication information receiving unit, may be configured as a pointing device such as a keyboard, a mouse, or the like. The operation input unit 24 receives various inputs from the user. For example, the operation input unit 24 receives the input of an identifying information such as a code (for example, a user ID, a password, or the like) to identify the user, the input for designating the printer 4 at the time of printing, or the input for setting various printing functions.

The display unit 25, which is an example of a display, may be configured as, for example, a liquid crystal display or the like. The display unit 25 displays the document data, a print setup dialog box, or the like, which is an example of a printing function setting unit.

The user ID storage unit 27, which is an example of a user identifying information memory, stores an identifying information (user identifying information) by which the user using the client PC 2 is identified and specified. For example, the user identifying information includes the user ID or the password used at the time of logging in the client PC 2, an account ID or the password used at the time of accessing the network 5, and the like. In addition, the user ID storage unit 27 stores the plural user identifying information, for example, when there are plural users of using the client PC 2.

The interface 26 controls the communication with the network 5.

The printer driver 23 serves as a print data generating controller. That is, when the printer driver 23 receives a print command of the document data generated and edited by the document data generating unit 21 or the document data stored in the storage unit 22 from the control unit 20, the printer driver 23 converts the print command from the control unit 20 into the print command for the printer 4 and then generates the print data as a print job, and the like. In addition, the printer driver 23 sends the generated print data and the user identifying information to the management server 3 via the interface 26. The print data is configured to include the document data and attribute data to set various printing functions. In addition, the printer driver 23 has a function of determining whether or not the print operation is permitted, or whether or not the use of printing functions is permitted in the printer 4 to be designated for printing, or the like before performing the print operation.

The printer driver 23 according to the first exemplary embodiment includes a print data generating portion 231, a user ID obtaining portion 232, and a print determining portion 233. The print data generating portion 231 generates the print data on the basis of the document data and the like. The user ID obtaining portion 232 is an example of an authentication information obtaining unit obtaining the user identifying information from the user ID storage unit 27 or the operation input unit 24. The print determining portion 233 is an example of a print determination unit obtaining a printing authority information (described below) from the management server 3 and determining whether or not performing the print operation, using the printing function, or the like is permitted.

The print determining portion 233 determines whether or not performing print operation in the printer 4 to be designated for printing at the time of printing is permitted, or whether or not the use of the specific printing function to be set is permitted by making a reference about whether or not printing in the printer 4 to be designated for printing is permitted (whether or not printing authority is set) and whether or not the use of specific printing function to be used at the time of printing in the printer 4 is permitted (whether or not usage authority of printing function is set) for the user identifying information obtained by the user ID obtaining unit 232 to the printing authority information obtained from the management server 3. As a result of the determination, in cases where the printing authority is set in the printer 4 to be designated for printing, or the usage authority is set in a specific printing function to be used, the print data generating portion 231 generates the print data and sends the generated print data together with the user identifying information to the printer 4 to be designated for printing. Alternatively, when the printing authority is not set in the printer 4 to be designated for printing, or the usage authority is not set in the specific printing function to be used, the print determining portion 233 sets the display unit 25 to display the message that no printing authority is set for the printer 4 and that no usage authority is set for the specific printing function for the notification and the like to the user. The print determining portion 233 sets the printer 4 for which the printing authority is set not to be designated and sets the printing function for which the usage authority is set not to be used.

Next, the management server 3 has a function of managing the use of the printer 4 connected to the network 5. The management server 3 stores the information (referred to as "a printing authority information") on whether or not each of the printers 4A to 4C is permitted to perform the print operation (the presence or absence of the printing authority), or whether or not the user is permitted to use the specific printing function in a specified printer 4 (the presence or absence of the usage authority for the printing function), which are set in response to the user identifying information. In addition, when the management server 3 receives the user identifying information from the client PC 2, the management server 3 has a function of supplying the printing authority information in response to the received user identifying information to the client PC 2 that has sent the user identifying information.

Figure 3:
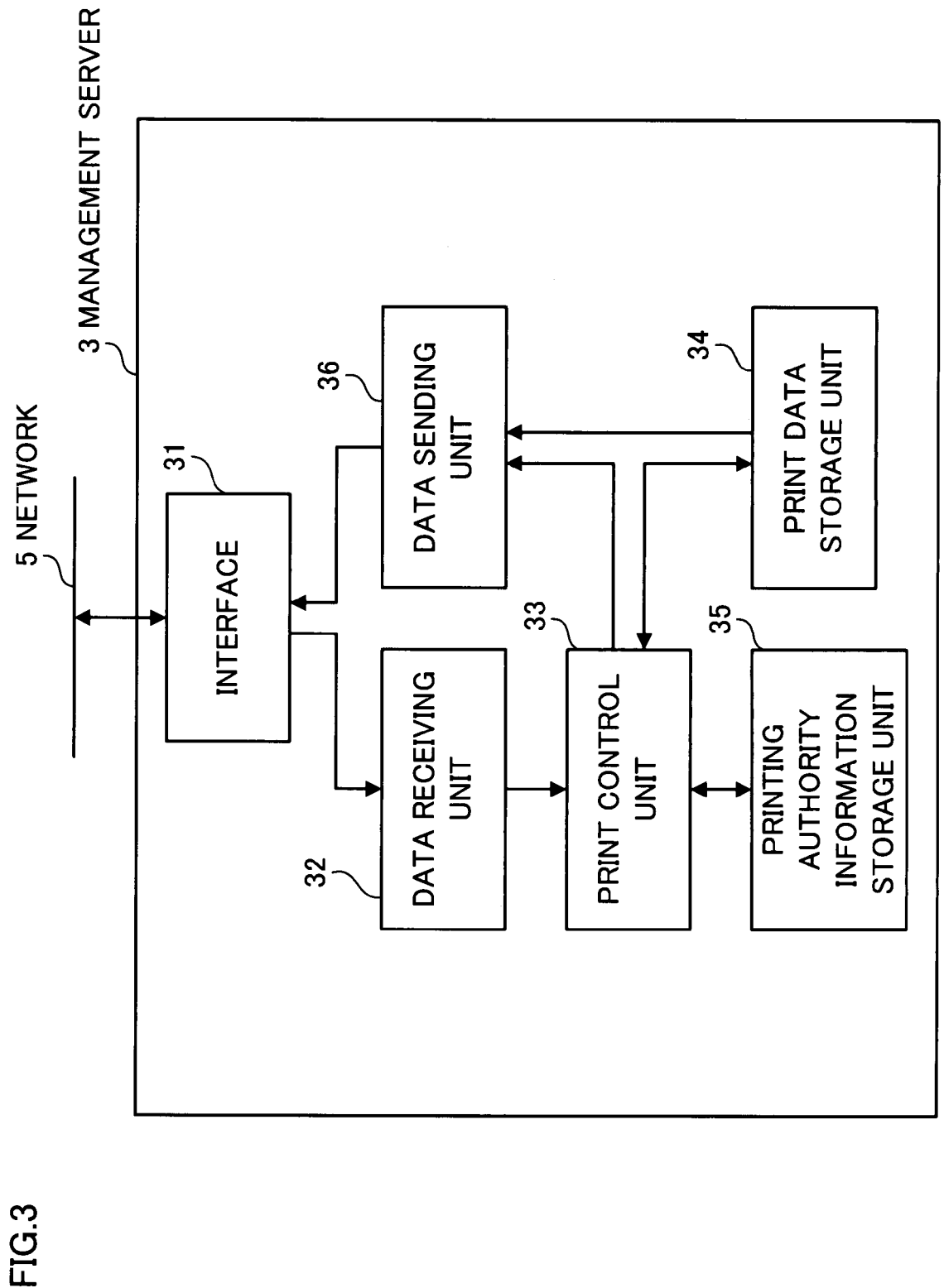
FIG. 3 is a block diagram illustrating a functional configuration of the management server.

FIG. 3 is a block diagram illustrating a functional configuration of the management server 3. As shown in FIG. 3, the management server 3 includes an interface 31, a data receiving unit 32, a print control unit 33, a print data storage unit 34, a printing authority information storage unit 35, and a data sending unit 36.

The interface 31 controls a communication with the network 5.

The data receiving unit 32 receives the user identifying information and the print data that has been sent from the client PC 2 via the network 5, and outputs the user identifying information and the print data to the print control unit 33.

The print control unit 33 receives the user identifying information and the print data that has been received by the data receiving unit 32 and outputs the received user identifying information and the print data to the print data storage unit 34. The print control unit 33 controls sending of the user identifying information and the print data stored in the print data storage unit 34 to the printer 4.

The print control unit 33 obtains the printing authority information in response to the received user identifying information from the printing authority information storage unit 35. And then, the print control unit 33 sends the obtained printing authority information to the data sending unit 36 so as to control sending the printing authority information to the client PC 2 that has sent the user identifying information from the data sending unit 36.

The print data storage unit 34 receives the user identifying information and the print data from the print control unit 33 and temporarily stores the received user identifying information and the print data.

The printing authority information storage unit 35, which is an example of an authority information memory, stores the information on the presence or absence of the printing authority in each of the printers 4A to 4C set in response to the user identifying information or the information on the presence or absence of the usage authority for various printing functions in each of the printers 4A to 4C set in response to the user identifying information as "the printing authority information."

FIGS. 4A and 4B are diagrams illustrating examples of the printing authority information stored in the printing authority information storage unit 35 in a table form. FIG. 4A is a diagram illustrating an example of the printing authority information, which is stored in the printing authority information storage unit 35 in a table form, on the presence or absence of the printing authority in the printers 4A to 4C in response to the user identifying information. FIG. 4B is a diagram illustrating an example of the printing authority information, which is stored in the printing authority information storage unit 35 in a table form, on the presence or absence of the usage authority for various printing functions in the printer 4 which has the printing authority in response to the user identifying information.

The printing authority information on the presence or absence of the printing authority in response to the user identifying information in the printers 4A to 4C shown in FIG. 4A will be described. For example, for the user ID and the password (the user identifying information) of the user_A, the print operation of the printer 4A is permitted and the print operation of the printers 4B and 4C is inhibited. For the user ID and the password of the user_B, the print operation of the printer 4B is permitted and the print operation of the printers 4A and 4C is inhibited. For the user ID and the password of the user_C, the print operation of the printer 4C is permitted and the print operation of the printers 4A and 4B is inhibited. In addition, for the user ID and the password of the user_D, the print operation of the printers 4B and 4C is permitted and the print operation of the printer 4A is prohibited.

Subsequently, the printing authority information on the usage authority for various printing functions in response to the user identifying information shown in FIG. 4B will be described. For example, for the user ID and the password (the user identifying information) of the user_A, output of the color printing, which is an example of the printing function, is inhibited, when the printer 4A performs the print operation (see FIG. 4A for reference). The restricted number of the sheets for print for one time print operation taken as an example of the printing function is set to 10 sheets. In addition, performing the print operation of printing the one page document data on one side of paper (one side/one-up), which is an example of the printing function, is also inhibited. The plural pages print form where the plural pages (N pages) document data is printed on one page of a paper is represented as "N-up". Likewise, the print form where the one page document data is printed on one page of a paper is represented as one-up.

Similarly, in the user ID and the password of the user_B, the output of the color printing is permitted when the print operation is performed in the printer 4B (see FIG. 4A for reference). The restricted number of the sheets for print is set to 100 sheets when one time print operation is performed. In addition, the print operation of printing the one page document data on one side (one side/one-up) is inhibited.

For the user ID and the password of the user_C, the output of the color printing is permitted when the print operation is performed in the printer 4C (see FIG. 4A for reference). The restricted number of the sheets for print is set to 100 sheets for one time print operation. In addition, the print operation of printing the one page document data on one side (one side/one-up) is permitted.

For the user ID and the password of the user_D, the output of the color printing is inhibited when the print operation is performed in the printers 4B and 4C (see FIG. 4A for reference). The restricted number of the sheets for print is set to 30 sheets for one time print operation. In addition, the print operation of the one page document data on one side (one side/one-up) is inhibited.

The printing function shown in FIG. 4B is an example. Usage authority may be set regarding whether or not other various printing functions are permitted. For example, as a printing function, in addition to the usage authority for the number of the sheets for print in one time print operation, the usage authority for the number of the sheets for print during one month may be set by setting the period, for example, from the first to the last day of each month.

Subsequently, the data sending unit 36 sends the user identifying information and the print data stored in the print data storage unit 34 to the printer 4 designated for printing via the interface 31 on the basis of the instruction of sending the user identifying information and the print data from the print control unit 33. On the basis of the sending instruction from the print control unit 33, the data sending unit 36 sends the printing authority information obtained from the printing authority information storage unit 35 to the client PC 2 that has sent the user identifying information.

Figure 5:
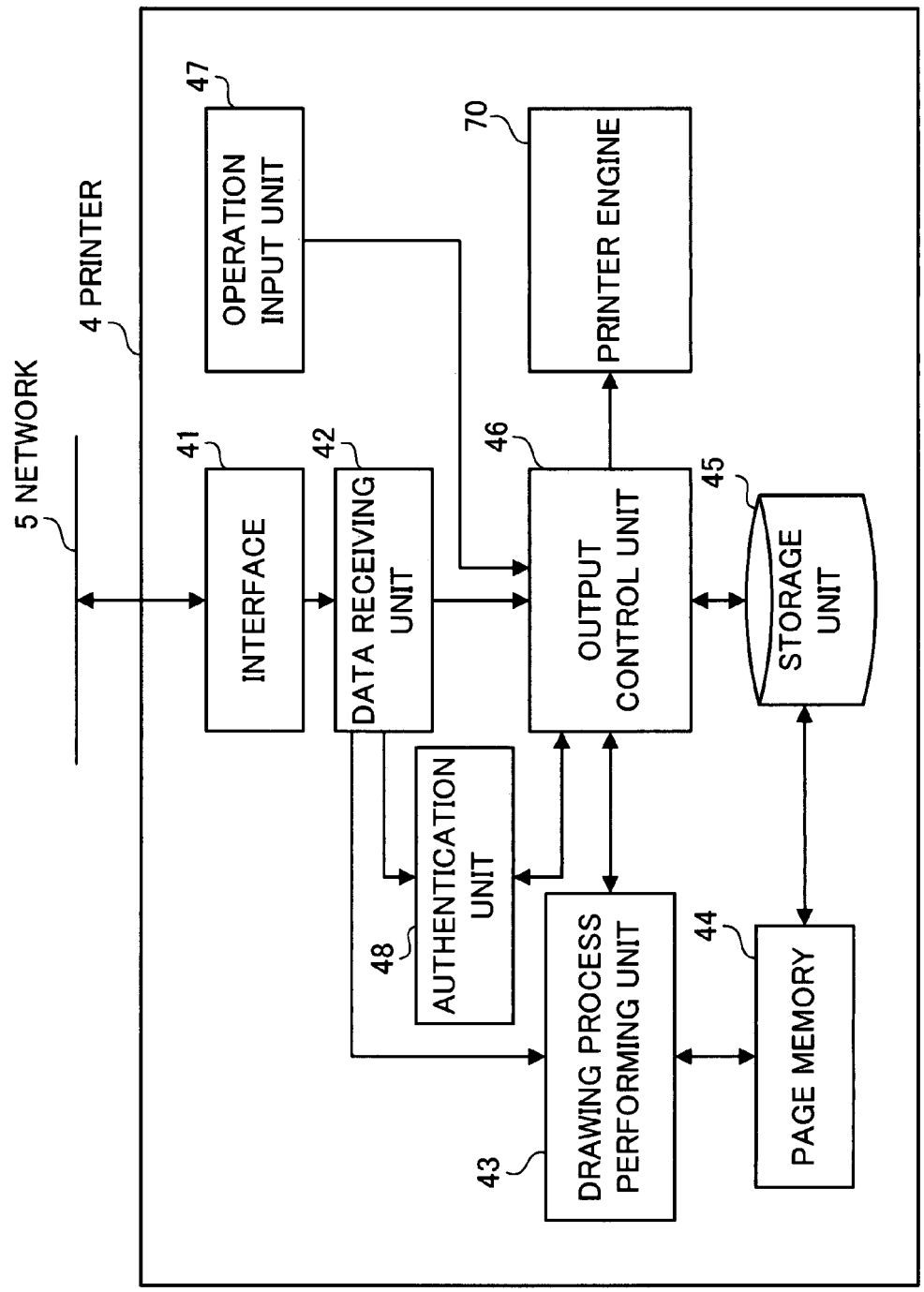
FIG. 5 is a block diagram illustrating a functional configuration of the printers.

Next, the printer 4 prints the document on paper with the designated form on the basis of the user identifying information or the print data sent from the management server 3. FIG. 5 is a block diagram illustrating a functional configuration of the printers 4 (4A to 4C). As shown in FIG. 5, the printer 4 includes an interface 41, a data receiving unit 42, a drawing process performing unit 43, a page memory 44, a storage unit 45, an output control unit 46, an operation input unit 47, an authentication unit 48, and a printer engine 70.

The interface 41 controls a communication with the network 5.

The data receiving unit 42 outputs the print data received from the management server 3 via the network 5 to the drawing process performing unit 43 and the output control unit 46. In addition, the data receiving unit 42 outputs the user identifying information (the user ID, the password, and the like) received from the management server 3 to the authentication unit 48.

The drawing process performing unit 43 receives the print data from the data receiving unit 42 and sequentially expands each object such as a character, an image, a picture, and the like of the document data included in the print data in the page memory 44. Besides, when the drawing process performing unit 43 expands the object in the page memory 44, the drawing process performing unit 43 decodes the coded image data, or the like.

The storage unit 45 may be configured as, for example, a hard disk drive having plural storing areas for storing each of the plural document data. The storage unit 45 receives and stores the document data expanded in the page memory 44.

The authentication unit 48 authenticates whether or not the print operation is permitted in the printer engine 70 on the basis of the user identifying information (the user ID, the password, and the like) received from the management server 3.

The output control unit 46 controls operations of sending the document data from the storage unit 45 to the printer engine 70, initiating the print operation, or the like on condition of the authentication in the authentication unit 48 on the basis of the print data received from the data receiving unit 42.

The operation input unit 47 may be configured as, for example, an operation panel. The operation input unit 47 receives an input of initiating the print operation by a user.

The printer engine 70 may be configured as, for example, an image forming unit using electrophotography, ink-jet, or the like. The printer engine 70 prints the document data on a paper.

Subsequently, the print operation performed in the printing system 1 according to the first exemplary embodiment will be described.

Figure 6A:
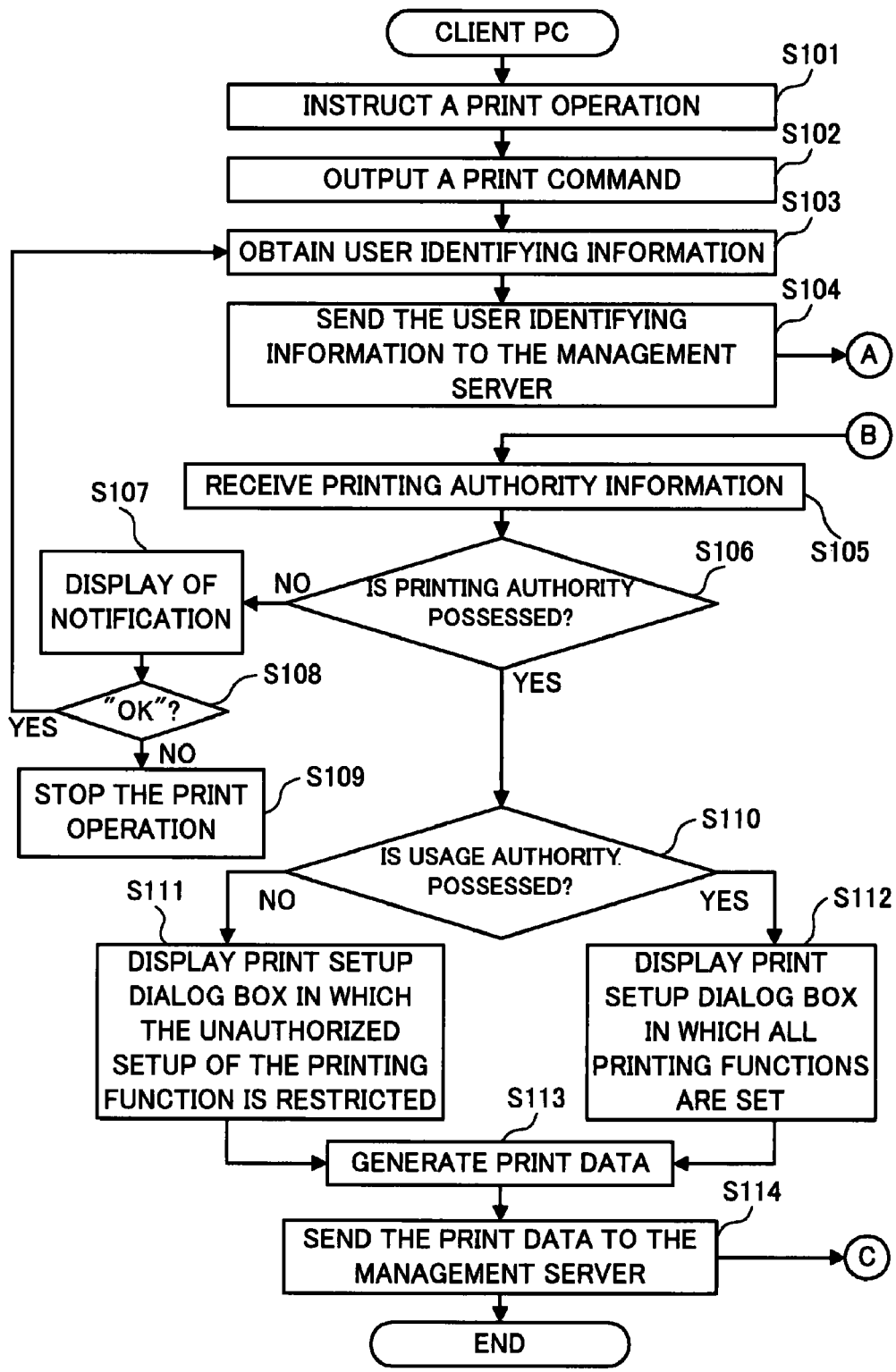
FIG. 6 consisting of 6A and 6B is a flowchart illustrating an example of a process sequence of the print operation in the printing system according to the first exemplary embodiment.
Figure 6B:
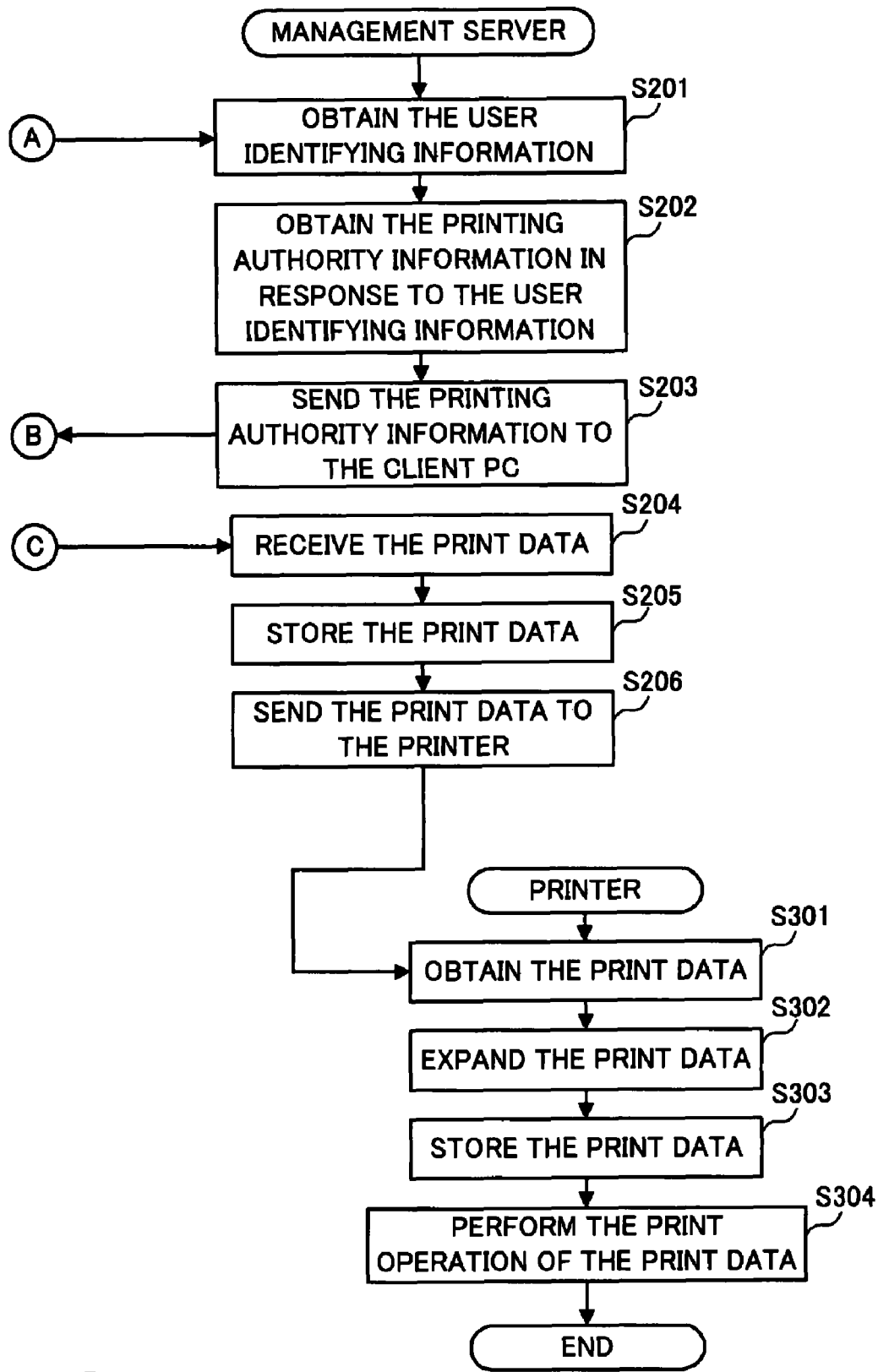

FIG. 6 consisting of 6A and 6G is a flowchart illustrating an example of a process sequence of the print operation in the printing system 1 according to the first exemplary embodiment. As shown in FIG. 6, first of all, in the client PC 2, the user instructs to print, for example, a predetermined document data generated in the document data generating unit 21 or a predetermined document data stored in the storage unit 22 from the operation input unit 24 (S101). And then, the control unit 20 outputs a print command of the document data to the printer driver 23 (S102).

In the printer driver 23 that receives the print command from the control unit 20, the user ID obtaining portion 232 obtains the user identifying information (S103). In addition, the obtained user identifying information is sent to the management server 3 via the interface 26 (S104).

Specifically, in the step S103, when the user ID obtaining portion 232 of the printer driver 23 receives a print command from the control unit 20, the user ID obtaining portion 232 requests the control unit 20 to display the dialog box to obtain the user identifying information, which is the information (the user authentication information) used at the time of authenticating the user in the authentication unit 48 of the printer 4. The control unit 20 displays the dialog box to set the user authentication information on the display unit 25 when the control unit 20 receives the request from the printer driver 23.

Figure 7A:
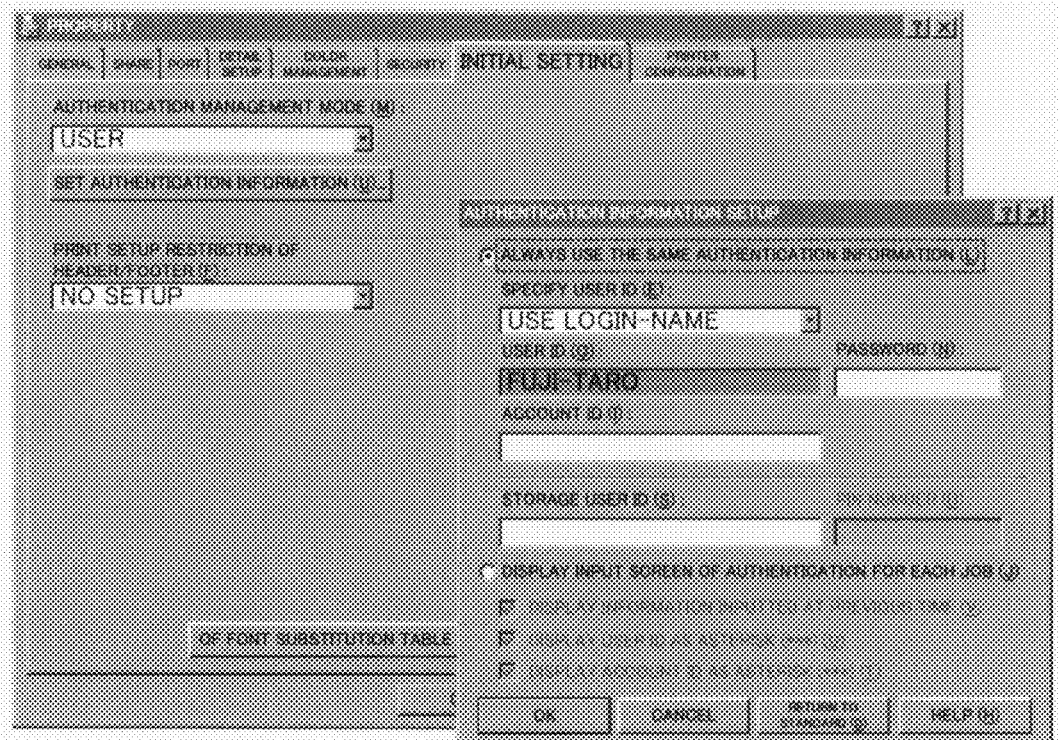
FIG. 7A is a diagram illustrating a state in which an "authentication information setup" dialog box to set the user authentication information is displayed from an "initial setup" tab after displaying the "initial setup" tab in a "print setting" dialog box on the display unit.
Figure 7B:
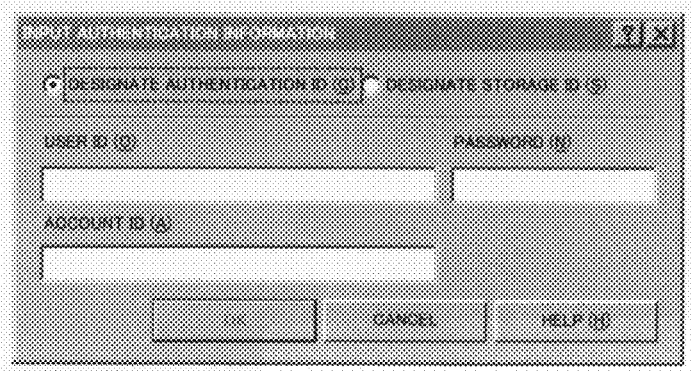
FIG. 7B is a diagram illustrating a state in which the "authentication information input" dialog box to set the user authentication information is displayed by checking the radio button of "display input screen of authentication for each job" in the "authentication information setup" dialog box on the display unit.

FIGS. 7A and 7B are diagrams illustrating examples of the dialog boxes to set the user authentication information which is displayed on the display unit 25. FIG. 7A is a diagram illustrating a state in which an "authentication information setup" dialog box to set the user authentication information is displayed from an "initial setup" tab after displaying the "initial setup" tab in a "print setting" dialog box on the display unit 25. FIG. 7B is a diagram illustrating a state in which the "authentication information input" dialog box to set the user authentication information is displayed by checking the radio button of "display input screen of authentication for each job (J)" in the "authentication information setup" dialog box on the display unit 25.

In FIG. 7A, the "authentication information setup" dialog box displays a state when the radio button of "always use the same authentication information (L)" is checked. In addition, in the "authentication information setup" dialog box, a case that a "use login name" in the column of a "specify user ID (E)" is selected is shown. In this case, "Fuji-Taro", which is an example of the user ID used at the time of logging in the client PC 2, is automatically obtained from the user ID storage unit 27 and is displayed in the column of "user ID (O)". In this state, a user inputs the password in the column of "password (N)" from the operation input unit 24 and clicks "OK" such that the user identifying information (the user ID and the password), as the user authentication information, is inputted in the user ID obtaining portion 232 of the printer driver 23.

When the radio button of the "display input screen of authentication for each job (J)" is checked in the "authentication information setup" dialog box shown in FIG. 7A, the "authentication information input" dialog box shown in FIG. 7B is displayed. On this occasion, the user checks the radio button of "designate authentication ID (C)" from the operation input unit 24. In addition, the user inputs the user ID in the column of the "user ID (O)" and the password in a column of the "password (N)" or inputs the account ID in a column of the "account ID (A)" and the password in the column of the "password (N)." And then, the user clicks the "OK" such that the user identifying information, as the user authentication information, is inputted in the user ID obtaining portion 232 of the printer driver 23.

The input of the user identifying information using the "authentication information input" dialog box shown in FIG. 7B is used when the plural users use the client PC 2.

Subsequently, when the management server 3 obtains the user identifying information from the client PC 2 via the network 5 (S201), the obtained user identifying information is sent from the data receiving unit 32 to the print control unit 33. The print control unit 33 obtains the printing authority information in response to the obtained user identifying information from the printing authority information storage unit 35 (S202).

The print control unit 33 sends the printing authority information in response to the obtained user identifying information from the data sending unit 36 to the client PC 2, which has sent the user identifying information, via the interface 31 (S203).

Next, when the client PC 2 receives the printing authority information in response to the user identifying information via the interface 26 (S105), the control unit 20 sends the printing authority information to the printer driver 23.

In the printer driver 23 that has obtained the printing authority information, when a specified printer 4 is designated for printing in the print setup dialog box by the user at the time of performing the print operation, the print determining portion 233 determines whether or not the used user identifying information (the user ID, the password, and the like) has the printing authority in the printer 4 designated for printing on the basis of the obtained printing authority information (S106). In this case, the printer driver 23 may serve as an authority information obtaining unit.

Alternatively, when the print determining portion 233 determines that the used user identifying information does not have the printing authority in the printer 4 designated for printing, the printer driver 23 instructs the control unit 20 to display the message regarding a non-permitted operation on the display unit 25. As a result, the display unit 25 displays the dialog box notifying that the printer 4 designated for printing is not permitted for performing the print operation (S107). That is, the display unit 25 performs a display for notification.

Figure 8:
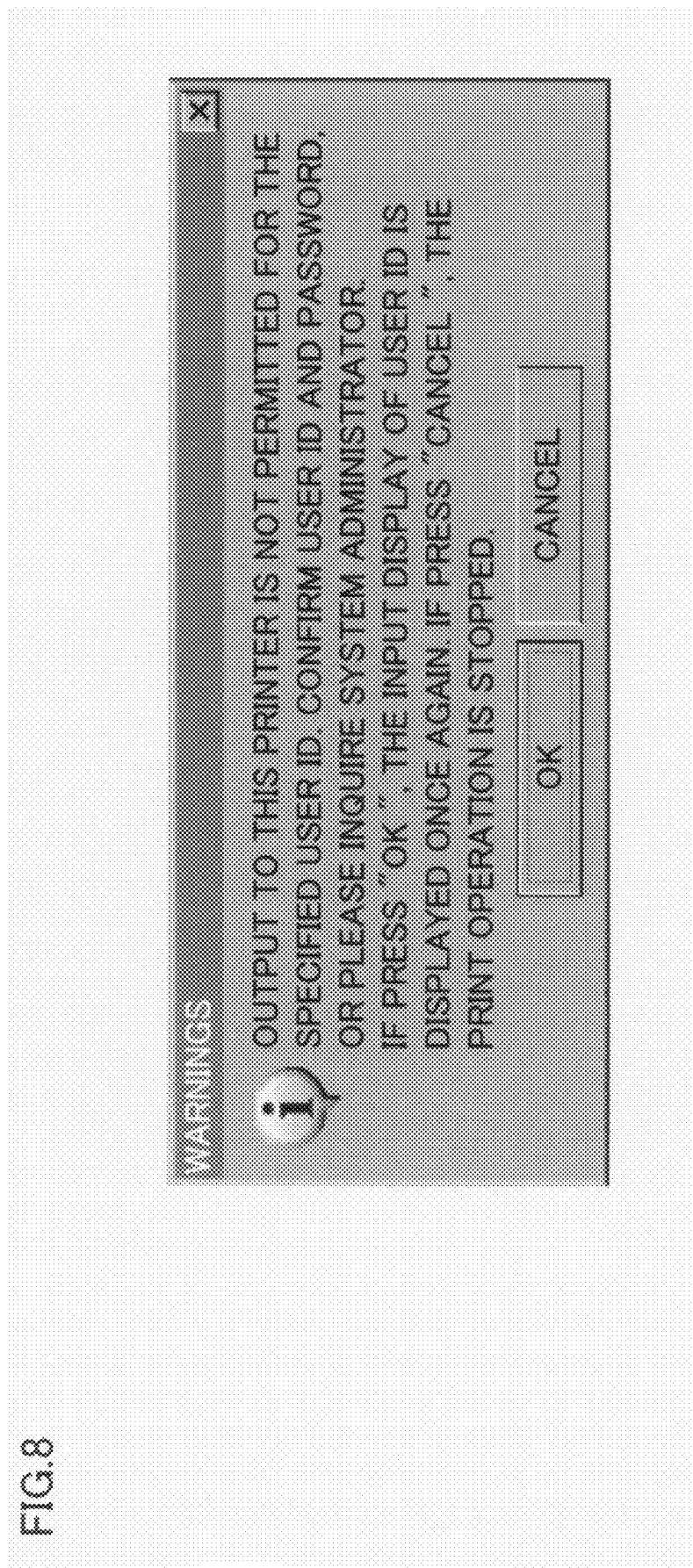
FIG. 8 is a diagram illustrating an example of the dialog box displayed for notification on the display unit.

FIG. 8 is a diagram illustrating an example of the dialog box displayed for notification on the display unit 25. By displaying the dialog box, such as the one shown in FIG. 8 on the display unit 25, the client PC 2 has the user recognize that performing the print operation of printing the document is not permitted in the printer 4 instructed to perform the print operation with the user ID and the password used in the present instruction for performing the print operation, that another user identifying information (for example, the user ID and the like) having the printing authority in the printer 4 designated for printing is required to be inputted again, or that the print operation should be stopped. In this manner, the client PC 2 urges the user to take appropriate measures.

Subsequently, when the "OK" is clicked in the dialog box shown in the step S107 (S108), the process returns to the user identifying information obtaining process of the step S103. Alternatively, when a "cancel" is clicked in the dialog box shown in the step S107 (S108), the print operation is stopped (S109).

In addition, in the print setup dialog box displayed thereafter, the print designation may be set to be restricted in the printer 4 which does not have the printing authority included in the printing authority information obtained in the step S105 as long as the input of the user identifying information is not performed again.

On the other hand, in the step S106, when the used user identifying information (the user ID, the password, and the like) is determined to have the printing authority in the printer 4 designated for printing, the print determining portion 233 determines whether or not the user identifying information has the usage authority for the printing function in the printer 4 designated for printing on the basis of the obtained printing authority information (S110).

Alternatively, when the print determining portion 233 determines that the user identifying information does not have the usage authority for the specific printing function in the printer 4 designated for printing by users, the print setup dialog box in which the unauthorized setup of the printing function is restricted is displayed (S111).

Figure 9:
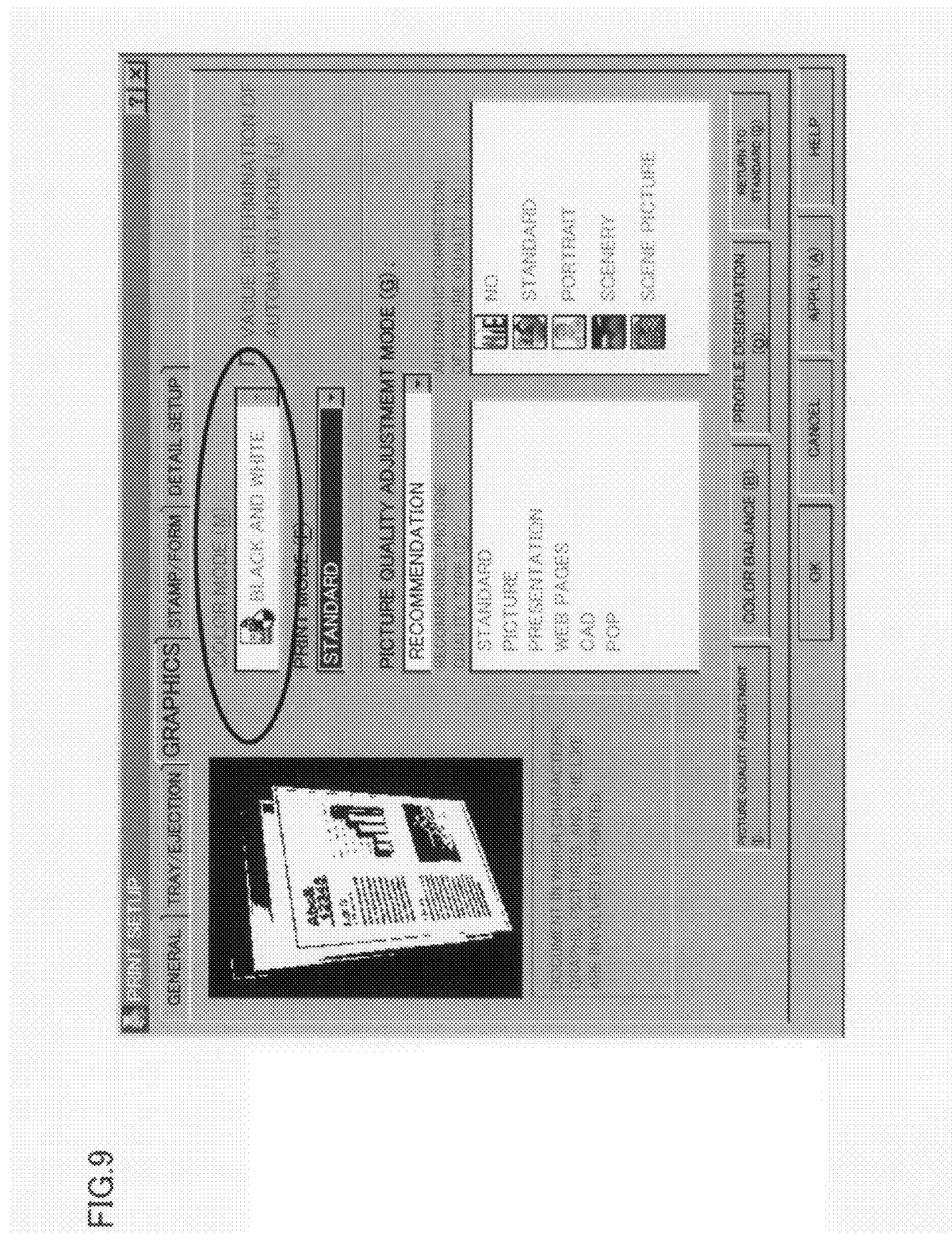
FIG. 9 is a diagram illustrating an example of the print setup dialog box in which the setup of the color printing function is restricted.

Specifically, suppose a case that, for example, the setup of the color printing function is restricted in the printing function which is not permitted to be used on the basis of the printing authority information. In this case, as shown in FIG. 9 (which is a diagram illustrating an example of the print setup dialog box in which the setup of the color printing function is restricted), the input column of a "color mode" is changed into a "black and white mode" in the print setup dialog box, and the input column of a "color mode" is a dim-out (grayed out) so as not to be changed into the color printing in the print setup dialog box (see the inside of the oval shown in FIG. 9 for reference). In this manner, the modified setup in which the black and white printing operation is forced to be set and in which the color printing operation is not permitted to be performed is acknowledged to the user in advance.

Likewise, when the printing function, for example, the usage of "one side/one-up" shown in FIG. 4B is restricted, the print setup dialog box in which the printing function of the "one side/one-up" is not permitted to be used for performing the print operation is displayed, such that changing the printing function into the two sides of paper, "2-up" as an example of "N-up", or the like is urged.

In addition, in the print data generating portion 231 of the printer driver 23, the print data in which, for example, the specific printing functions, such as the color printing function or "one side/one-up" printing function, are not set is generated on the basis of the input from the user in the print setup dialog box displayed in the step S111 (S113).

On the other hand, in the step S110, the restriction on the printing function is not provided for the used user identifying information (the user ID, the password, and the like) in the printer 4 designated for printing by a user. That is, when the user identifying information is determined to have the usage authority for all printing functions, the print setup dialog box in which all printing functions are set is displayed (S112). In addition, the print data on the basis of the document data and the print form set in the print setup dialog box by a user is generated in the print data generating portion 231 of the printer driver 23 (S113).

Subsequently, the print data generated in the step S113 is sent together with the user identifying information from the printer driver 23 to the management server 3 via the interface 26 (S114).

When the management server 3 receives the user identifying information and the print data from the client PC 2 (S204), the data receiving unit 32 sends the user identifying information and the print data to the print control unit 33. The print control unit 33 temporarily stores the user identifying information and the print data in the print data storage unit 34 (S205). Subsequently, the print control unit 33 reads the user identifying information and the print data from the print data storage unit 34 at a predetermined timing and sends them from the data sending unit 36 to the printer 4 via the interface 31 (S206). On this occasion, when the plural user identifying information and print data are stored in the print data storage unit 34, the print control unit 33 determines the output sequence of each print data.

When the printer 4 obtains the user identifying information and the print data from the management server 3 via the network 5 (S301), the data receiving unit 42 outputs the print data to the drawing process performing unit 43 and the user identifying information to the authentication unit 48. The drawing process performing unit 43 sequentially expands each object such as a character, an image, or the like of the document data in the print data in the page memory 44 (S302). When the drawing process performing unit 43 expands the document data in the page memory 44, the drawing process performing unit 43 decodes the coded image data. In addition, the drawing process performing unit 43 stores the document data expanded in the page memory 44 in the storage unit 45 (S303).

The data receiving unit 42 outputs the print data to the output control unit 46 as well. The output control unit 46 sets the print form on the basis of the attribute data of the print data. Subsequently, the output control unit 46 reads the document data stored in the storage unit 45 and allows the printer engine 70 to print the document data with the set print form on condition of the authentication in the authentication unit 48 (S304).

In the printing system 1 according to the first exemplary embodiment, the configuration in which the client PC 2 determines in advance whether or not the print operation is performed in the printer 4 designated for printing and whether or not the printing function is used, before executing a print operation is described. In addition to such a configuration, it may be considered that, for example, the client PC 2 is configured to perform the print operation by modifying the setup of the printing function automatically given usage authority, while the client PC 2 determines whether or not the print operation is performed in the printer 4 designated for printing before performing the actual print operation, and does not determine whether or not the printing function is used. In this case, it may be considered that the printing function modified the setup automatically is configured to be set in advance.

As describe above, in the printing system 1 according to the first exemplary embodiment, the client PC 2 determines whether or not the print operation is permitted, or whether or not the use of printing functions is permitted in the printer 4 designated for printing, or the like before performing the actual print operation. In addition, at the time of performing the print operation, when performing the print operation or using specific printing functions is not permitted in the printer 4 designated for printing by a user, or the like, the client PC 2 displays the message regarding the non-permitted operation. In addition, the client PC 2 sets the specified printer 4 not to be designated or the specific printing function not to be used.

In the printing system 1 according to the first exemplary embodiment, the user recognizes the specific printer 4 that is not permitted to be used by the user in advance. Therefore, the user performs a print operation efficiently from a standpoint of the time saving by choosing the printer 4 that is made an instruction for performing the print operation by the user effectively.

In case of performing the print operation in the specific printer 4 that is set to be restricted the use of any printing function, the user also performs a print operation efficiently from a standpoint of the time saving by choosing the printing functions of the printer 4 that is made an instruction for performing the print operation by the user effectively. That is because the user recognizes the printing functions set to be restricted the use in advance.

Second Exemplary Embodiment

In the printing system 1 according to the first exemplary embodiment, the configuration in which the client PC 2 obtains the printing authority information from the management server 3 and determines whether or not the print operation is performed, whether or not the printing function is used, or the like is described. In a printing system 10 according to a second exemplary embodiment, a configuration in which the client PC 2 obtains the printing authority information from the printer 4 and determines whether or not the print operation is performed, whether or not the printing function is used, or the like will be described. In addition, in the same configuration as the first exemplary embodiment, the same reference numerals and signs are used and the detailed description will be omitted.

Figure 10:
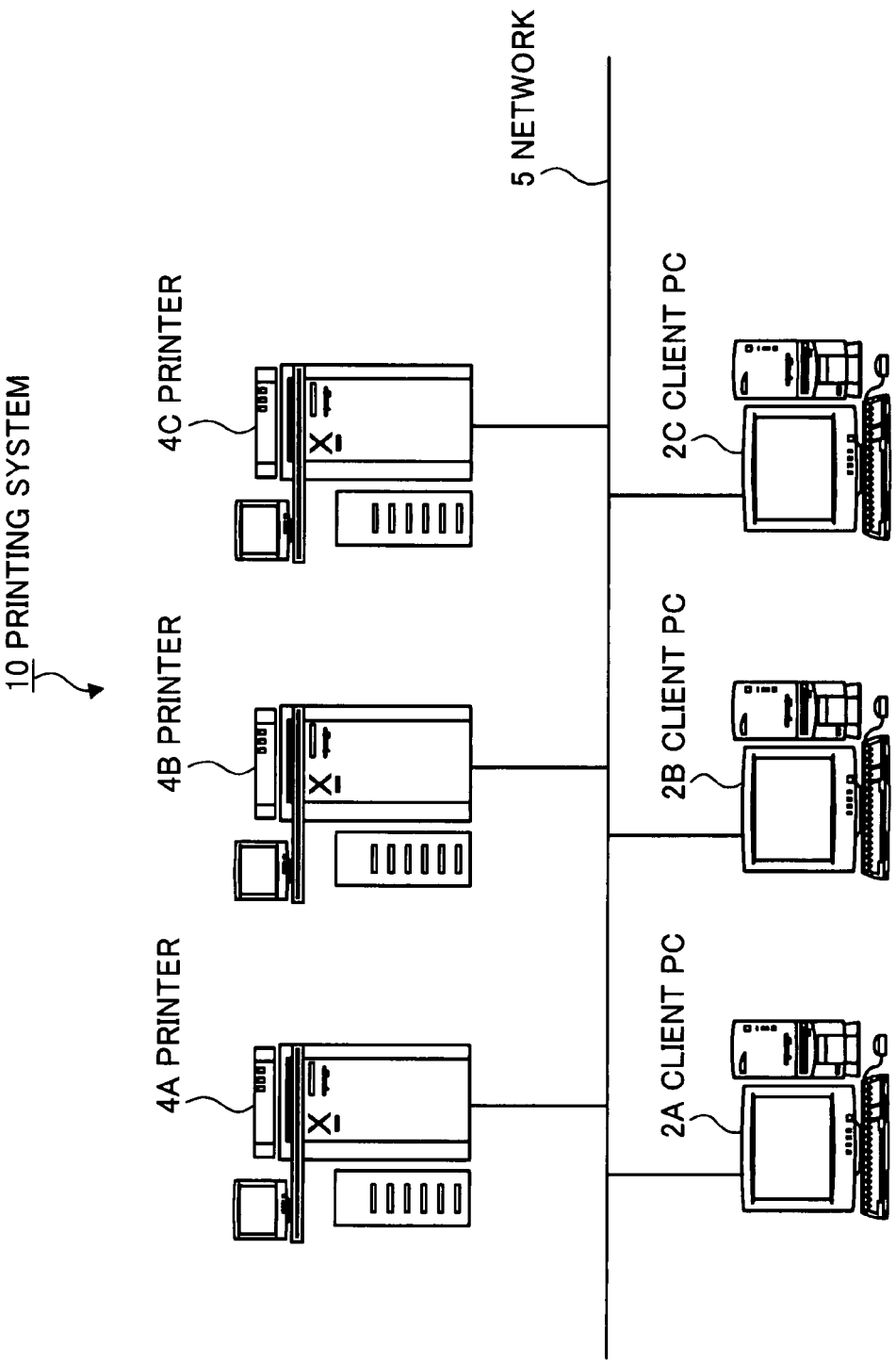
FIG. 10 is a diagram illustrating the overall configuration of the printing system according to the second exemplary embodiment.

FIG. 10 is a diagram illustrating the overall configuration of the printing system 10 according to the second exemplary embodiment. In the printing system 10 shown in FIG. 10, the client PCs (personal computers) 2 (2A to 2C), which are examples of terminals, and the printers 4 (4A to 4C), which are examples of image forming apparatuses to print document data generated in the client PC 2 on a paper are configured to be connected via the network 5 such that interactive communication is possible. That is, in the printing system 10 according to the second exemplary embodiment, the management server 3 according to the first exemplary embodiment is not installed, or a system configuration in which a management server 3 is installed but the management server 3 does not have the printing authority information is used. In addition, FIG. 10 is a diagram illustrating the system configuration in which the management server 3 is not installed.

In the printing system 10 according to the second exemplary embodiment, each of the printers 4A to 4C has a function of printing documents on paper with designated forms on the basis of the print data sent from the client PC 2. In addition, each of the printers 4A to 4C stores information on whether or not the print operation set in response to user identifying information of each of the printers 4A to 4C is permitted (the presence or absence of the printing authority), or information (printing authority information) on whether or not a user is permitted to use a specific printing function in each of the printers 4A to 4C (the presence or absence of the usage authority for the printing function). Moreover, when each of the printers 4A to 4C receives the user identifying information from the client PC 2, each of the printers 4A to 4C has a function of supplying the printing authority information of each of the printers 4A to 4C in response to the received user identifying information to the client PC 2 that has sent the user identifying information.

Figure 11:
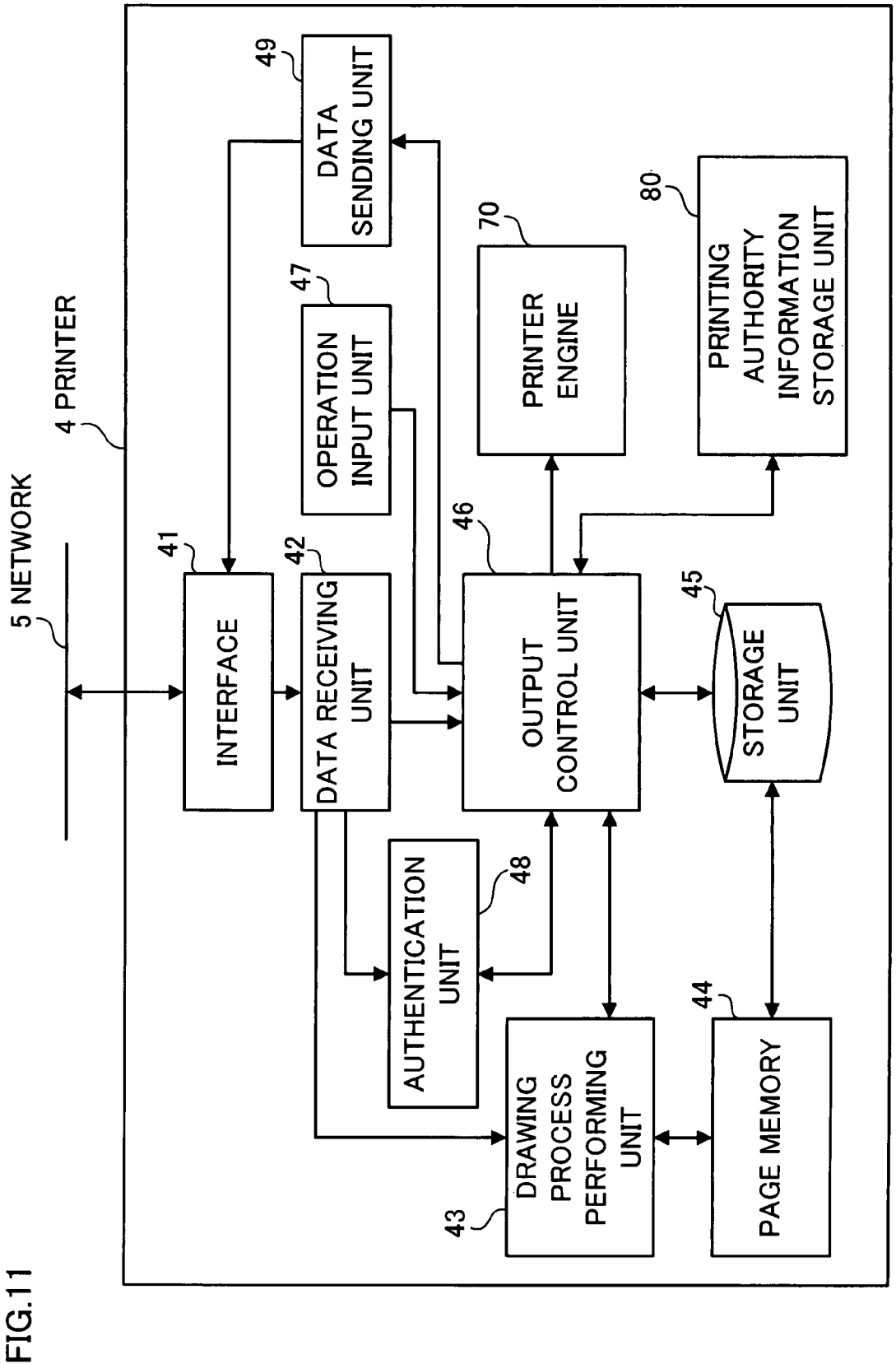
FIG. 11 is a block diagram illustrating a functional configuration of the printers, according to the second exemplary embodiment.

FIG. 11 is a block diagram illustrating a functional configuration of the printers 4 (4A to 4C), according to the second exemplary embodiment. As shown in FIG. 11, each of the printers 4A to 4C includes an interface 41, a data receiving unit 42, a drawing process performing unit 43, a page memory 44, a storage unit 45, an output control unit 46, an operation input unit 47, an authentication unit 48, and a printer engine 70, and further includes a printing authority information storage unit 80 and a data sending unit 49.

The printing authority information storage unit 80, which is an example of the authority information memory, stores information on the presence or absence of the printing authority in each of the printers 4A to 4C set in response to the user identifying information, or the information on the presence or absence of the usage authority for the printing function in each of the printers 4A to 4C set in response to the user identifying information as the "printing authority information" in each of the printers 4A to 4C.

FIGS. 12A and 12B are diagrams illustrating examples of the printing authority information stored in the printing authority information storage unit 80 of the printer 4A as an example among the printers 4A to 4C in a table form. FIG. 12A is a diagram illustrating an example of the printing authority information, which is stored in the printing authority information storage unit 80 of the printer 4A as an example among the printers 4A to 4C in a table form, on the presence or absence of the printing authority in the printer 4A in response to the user identifying information. FIG. 12B is a diagram illustrating an example of the printing authority information, which is stored in the printing authority information storage unit 80 of the printer 4A as an example among the printers 4A to 4C in a table form, on the presence or absence of the usage authority for various printing functions in the printer 4A in response to the user identifying information.

The printing authority information on the presence or absence of the printing authority in response to the user identifying information in the printer 4A shown in FIG. 12A will be described. For example, for the user ID and the password (user identifying information) of the user_A and for the user ID and the password of the user_C, the print operation is permitted in the printer 4A. In contrast, for the user ID and the password of the user_B and for the user ID and the password of the user_D, the print operation is inhibited in the printer 4A.

In addition, the printing authority information on the usage authority of various printing functions in response to the user identifying information in the printer 4A shown in FIG. 12B is the same as the one described in FIG. 4B according to the first exemplary embodiment.

When the printer 4 receives the user identifying information from the client PC 2, the output control unit 46 reads the printing authority information set in response to the received user identifying information from the printing authority information storage unit 80 and then sends the printing authority information from the data sending unit 49 to the client PC 2 that has sent the user identifying information via the interface 41.

Subsequently, the print operation performed in the printing system 10 according to the second exemplary embodiment will be described.

Figure 13A:
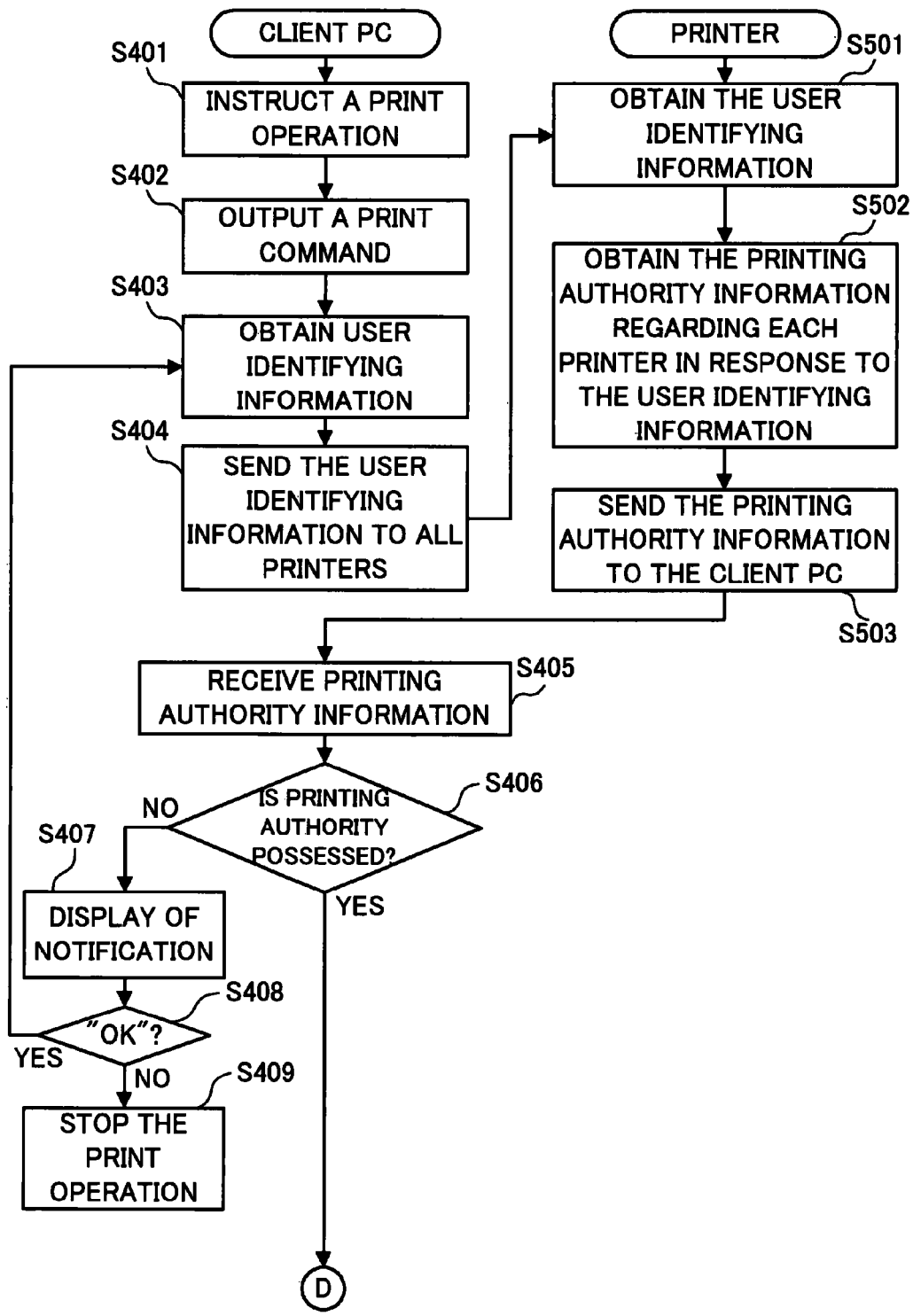
FIG. 13 consisting of 13A and 13B is a flowchart illustrating an example of a process sequence of the print operation in the printing system according to the second exemplary embodiment.
Figure 13B:
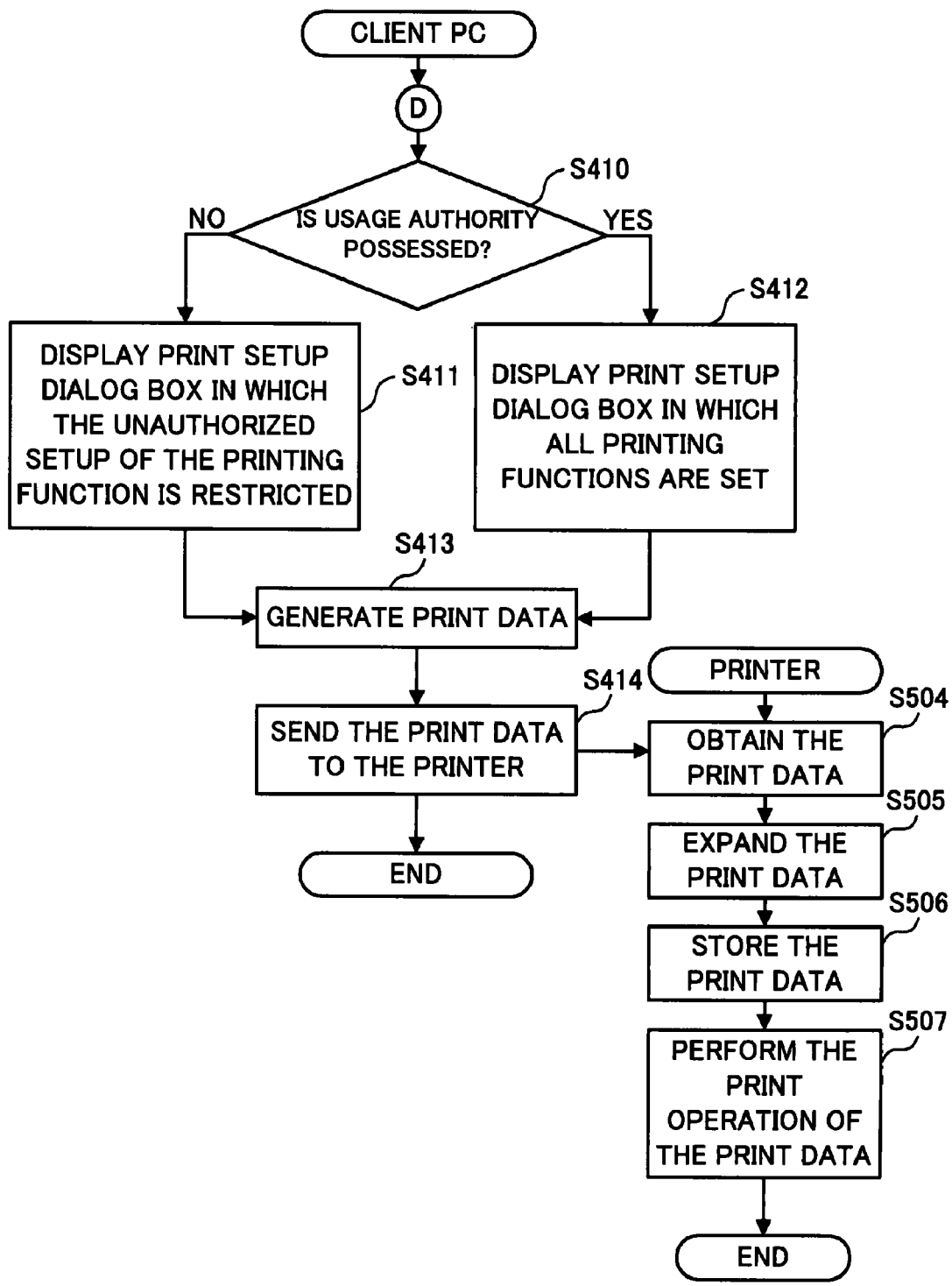

FIG. 13 consisting of 13A and 13B is a flowchart illustrating an example of a process sequence of the print operation in the printing system 10 according to the second exemplary embodiment. As shown in FIG. 13A, first of all, in the client PC 2, the user instructs to print, for example, a predetermined document data generated in the document data generating unit 21 or a predetermined document data stored in the storage unit 22 from the operation input unit 24 (S401). And then, the control unit 20 outputs a print command of the document data to the printer driver 23 (S402).

In the printer driver 23 that receives the print command from the control unit 20, the user ID obtaining portion 232 obtains the user identifying information (S403). Regarding the method for obtaining the user identifying information by the user ID obtaining portion 232, it is the same as the one described in the first exemplary embodiment. In addition, the obtained user identifying information is sent to all printers 4 (4A to 4C) connected to the network 5 via the interface 26 (S404).

Subsequently, when each of the printers 4 obtains the user identifying information from the client PC 2 via the network 5 (S501), the obtained user identifying information is sent from the data receiving unit 42 to the output control unit 46. The output control unit 46 obtains the printing authority information regarding the printer 4 in response to the obtained user identifying information from the printing authority information storage unit 80 (S502).

The output control unit 46 sends the printing authority information regarding the printer 4 in response to the obtained user identifying information from the data sending unit 49 to the client PC 2, which has sent the user identifying information, via the interface 41 (S503).

Next, when the client PC 2 receives the printing authority information regarding the printers 4A to 4C in response to the user identifying information via the interface 26 (S405), the control unit 20 sends the printing authority information to the printer driver 23.

In the printer driver 23 that has obtained the printing authority information regarding the printers 4A to 4C, when a specified printer 4 is designated for printing in the print setup dialog box by the user at the time of performing the print operation, the print determining portion 233 determines whether or not the used user identifying information (the user ID, the password, and the like) has the printing authority in the printer 4 designated for printing on the basis of the obtained printing authority information regarding each of the printers 4A to 4C (S406). In this case, the printer driver 23 may serve as the authority information obtaining unit.

Alternatively, when the print determining portion 233 determines that the used user identifying information does not have the printing authority in the printer 4 designated for printing, the printer driver 23 instructs the control unit 20 to display the message regarding a non-permitted operation on the display unit 25. As a result, the display unit 25 displays the dialog box notifying that the printer 4 designated for printing is not permitted for performing the print operation (S407). That is, the display unit 25 performs a display for notification. The display for notification at the step S407 is performed in the dialog box that is the same as one described in the first exemplary embodiments (See FIG. 8 as a reference).

Subsequently, when the "OK" is clicked in the dialog box shown in the step S407 (S408), the process returns to the user identifying information obtaining process of the step S403. Alternatively, when a "cancel" is clicked in the dialog box shown in the step S407 (S408), the print operation is stopped (S409).

In addition, in the print setup dialog box displayed thereafter, the print designation may be set to be restricted in the printer 4 which does not have the printing authority included in the printing authority information obtained in the step S405 as long as the input of the user identifying information is not performed again.

On the other hand, in the step S406, when the used user identifying information (the user ID, the password, and the like) is determined to have the printing authority in the printer 4 designated for printing, the print determining portion 233 determines whether or not the user identifying information has the usage authority for the printing function in the printer 4 designated for printing on the basis of the obtained printing authority information regarding each of the printers 4A to 4C (S410).

Alternatively, when the print determining portion 233 determines that the user identifying information does not have the usage authority for the specific printing function in the printer 4 designated for printing by users, the print setup dialog box in which the unauthorized setup of the printing function is restricted is displayed (S411).

In addition, in the print data generating portion 231 of the printer driver 23, the print data in which, for example, the specific printing functions such as the color printing function or "one side/one-up" printing function are not set is generated on the basis of the input from the user in the print setup dialog box displayed in the step S411 (S413).

On the other hand, in the step S410, the restriction on the printing function is not provided for the used user identifying information (the user ID, the password, and the like) in the printer 4 designated for printing by a user. That is, when the user identifying information is determined to have the usage authority for all printing functions, the print setup dialog box in which all printing functions are set is displayed (S412). In addition, the print data is generated on the basis of the document data and the print form set in the print setup dialog box by a user, in the print data generating portion 231 of the printer driver 23 (S413).

Subsequently, the print data generated in the step S413 is sent together with the user identifying information from the printer driver 23 to the printer 4 via the interface 26 (S414).

When the printer 4 obtains the user identifying information and the print data from the Client PC 2 via the network 5 (S504), the data receiving unit 42 outputs the print data to the drawing process performing unit 43 and the user identifying information to the authentication unit 48. The drawing process performing unit 43 sequentially expands each object, such as a character, an image, or the like, of the document data in the print data in the page memory 44 (S505). When the drawing process performing unit 43 expands the document data in the page memory 44, the drawing process performing unit 43 decodes the coded image data. In addition, the drawing process performing unit 43 stores the document data expanded in the page memory 44 in the storage unit 45 (S506).

The data receiving unit 42 outputs the print data to the output control unit 46 as well. The output control unit 46 sets the print form on the basis of the attribute data of the print data. Subsequently, the output control unit 46 reads the document data stored in the storage unit 45 and allows the printer engine 70 to print the document data with the set print form on condition of the authentication in the authentication unit 48 (S507).

In this manner, the printing system 10 according to the second exemplary embodiment, each of the printers 4A to 4C stores the information on the presence or absence of the printing authority in each of the printers 4A to 4C set in response to the user identifying information, or the information on the presence or absence of the usage authority for the printing function in each of the printers 4A to 4C set in response to the user identifying information as the printing authority information in each of the printers 4A to 4C. In addition, when each of the printers 4A to 4C receives the user identifying information from the client PC 2, the printing authority information in each of the printers 4A to 4C in response to the received user identifying information is supplied to the client PC 2 that has sent the user identifying information.

At the time of performing the print operation, the client PC 2 determines whether or not the print operation is permitted, whether or not the use of printing functions is permitted in the printer 4 designated for printing, or the like before performing the actual print operation on the basis of the printing authority information supplied from each of the printers 4A to 4C. At the time of performing the print operation, when performing the print operation in the printer 4 designated for printing by a user, using specific printing functions in the printer 4 designated for printing by a user, or the like is not permitted, the client PC 2 displays the message regarding the non-permitted operation. In addition, the client PC 2 sets the specified printer 4 not to be designated or the specific printing function not to be used.

In the printing system 10 according to the second exemplary embodiment, the user recognizes the specific printer 4 that is not permitted to be used by the user in advance. Therefore, the user performs a print operation efficiently from a standpoint of the time saving by choosing the printer 4 that is made an instruction for performing the print operation by the user effectively.

In case of performing the print operation in the specific printer 4 that is set to be restricted the use of any printing function, the user also performs a print operation efficiently from a standpoint of the time saving by choosing the printing functions of the printer 4 that is made an instruction for performing the print operation by the user effectively. That is because the user recognizes the printing functions set to be restricted the use in advance.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

Furthermore, in the exemplary embodiments, it is also possible to record a program corresponding to the flowcharts shown in FIG. 13 in an information recording media such as a flexible disk, or obtain and record the program corresponding to the flowchart by a network such as the Internet or by telephone communication, the program is read out and executed by using a general-purpose computer such as a microcomputer etc. and thereby makes the computer function as the printer driver 23 according to the exemplary embodiments.

What is claimed is:

1. A printing system comprising:
a terminal of a plurality of terminals that outputs print data of a print target and authentication information required for performing a print operation;
a plurality of image forming units; and
an authority information memory that stores printing authority information on the presence or absence of the printing authority given to each of the authentication information in the image forming unit and that stores printing function authority information on the presence or absence of usage authority of various printing functions of the image forming unit, the usage authority being given to each of the authentication information output by the terminal,
the terminal including:
an authentication information obtaining unit that obtains the authentication information;
an authority information obtaining unit that obtains the printing authority information from the authority information memory;
a print determination unit that determines whether or not the authentication information obtained by the authentication information obtaining unit permits a specific print operation by the image forming unit on the basis of the printing authority information obtained by the authority information obtaining unit;
a display unit that displays a print setup dialog box where the specific print operation determined to not be permitted based upon the authentication information obtained by the authentication information obtaining unit is restricted;
an input unit that receives input from a user based upon the print setup dialog box;
a print data unit that updates the print data on the basis of the input received from the user; and an output unit that outputs the updated print data and the authentication information to an image forming unit of the plurality of image forming units, wherein the image forming unit receives the updated print data and the authentication information from the terminal and that prints the updated print data on condition that printing authority for permitting the print operation is given to the authentication information.

2. The printing system according to claim 1, wherein the authority information obtaining unit further obtains the printing function authority information from the authority information memory, and the terminal further includes a printing function setting unit that is configured to make the setting of a printing function with the usage authority to the authentication information effective, and to make the setting of a printing function without the usage authority to the authentication information invalid, on the basis of the obtained printing function authority information.

3. The printing system according to claim 1, wherein the terminal outputs user identifying information, as the authentication information, that identifies a user instructing the print operation of the print target.

4. The printing system according to claim 1, wherein the authority information memory is incorporated into the image forming unit.

5. The printing system according to claim 1, wherein the printing authority information includes information on the presence or absence of the printing authority given to each of a plurality of users for each of the plurality if image forming units.

6. The printing system according to claim 1, wherein when the specific print operation determined to not be permitted, the print setup dialog box is restricted until new authentication information is obtained by the authentication information obtaining unit.

7. A print controller comprising:

an authentication information obtaining unit that obtains authentication information required for a print operation of a print target;

an authority information obtaining unit that obtains information regarding at least any one of the presence or absence of authority that is given to each of the authentication information obtained by the authentication information obtaining unit for performing the print operation from an authority information memory incorporated in an image forming unit, and the presence or absence of authority that is given to each of the authentication information for using various printing functions;

a display unit that displays a print setup dialog box where the print operation, or at least one of the various printing functions, is restricted when the authority information obtaining unit that obtains information regarding the absence of authority of the print operation or the at least one of the various printing functions;

an input unit that receives input from a user based upon the print setup dialog box; and a print data generating controller that controls generation of print data of the print target on the basis of the information obtained by the authority information obtaining unit and the input unit.

8. The print controller according to claim 7, wherein the print data generating controller determines whether or not the print operation of the print data is permitted by the authentication information obtained by the authentication information obtaining unit at the time of generating the print data.

9. The print controller according to claim 7, wherein, at the time of generating the print data, the print data generating controller makes the setting of a printing function with usage authority to the authentication information obtained by the authentication information obtaining unit effective, and makes the setting of a printing function without the usage authority to the authentication information invalid.

10. The print controller according to claim 7, further comprising a user identifying information memory that stores user identifying information, as the authentication information, the user identifying information identifying a user that instructs the print operation of the print target.

11. The print controller according to claim 10, wherein the authentication information obtaining unit obtains the user identifying information, as the authentication information, from the user identifying information memory.

12. The print controller according to claim 7, further comprising an authentication information receiving unit that receives an input of the authentication information.

13. The print controller according to claim 12, wherein the authentication information obtaining unit obtains the authentication information inputted by the authentication information receiving unit.

14. A printing method comprising:

obtaining authentication information required for performing a print operation;

obtaining printing authority information on the presence or absence of printing authority for permitting the print operation from an authority information memory incorporated in an image forming unit, the printing authority being given to each of the authentication information or printing function authority information on the presence or absence of usage authority of various printing functions, the usage authority being given to each of the authentication information;

determining whether or not the obtained authentication information permits the print operation or at least one of the various printing functions on the basis of the obtained printing authority information;

displaying a print setup dialog box where the print operation, or the at least one of the various printing functions, determined to not be permitted is restricted;

receiving input from a user based upon the print setup dialog box;

outputting print data of a print target and the authentication information;

receiving the print data and the authentication information;

printing the print data on condition that the printing authority is given to the authentication information; and storing the printing authority information.

15. A non-transitory computer readable medium storing a program causing a computer to execute a process for a print operation, the process comprising:

obtaining authentication information required for the print operation of a print target;

obtaining information regarding at least any one of the presence or absence of authority for performing the print operation that is given to each of the authentication information from an authority information memory incorporated in an image forming unit, and the presence or absence of authority that is given to each of the authentication information for using various printing functions;

displaying a print setup dialog box where the print operation, or at least one of the various printing functions, is restricted when information regarding the absence of authority is obtained;

receiving input from a user based upon the print setup dialog box; and controlling generation of print data of the print target on the basis of the obtained information and user input.

16. The non-transitory computer readable medium according to claim 15, wherein the process of controlling the generation of the print data determines whether or not the print operation of the print data is permitted on the basis of the obtained authentication information and displays non-permission of the print operation of the print data when the process of controlling the generation of the print data determines that the print operation of the print data is not permitted.

17. The non-transitory computer readable medium according to claim 15, wherein, at the time of generating the print data, the process of controlling the generation of the print data makes the setting of a printing function with usage authority to the obtained authentication information effective, and makes the setting of the printing function without the usage authority to the authentication information invalid.

* * * * *